United States Patent [19]

Slowinski

[11] Patent Number: 5,103,768

[45] Date of Patent: Apr. 14, 1992

[54] BIRDHOUSE WITH NOVEL MOUNTING APPARATUS

[76] Inventor: W. Kent Slowinski, P.O. Box 5588, Washington, D.C. 20016

[21] Appl. No.: 592,418

[22] Filed: Oct. 3, 1990

[51] Int. Cl.⁵ .............................................. A01K 31/00
[52] U.S. Cl. ..................................... 119/23; 119/57.8
[58] Field of Search ....................... 119/23, 57.8, 57.9; 446/476, 477

[56] References Cited

U.S. PATENT DOCUMENTS

| | | | |
|---|---|---|---|
| 1,358,119 | 11/1920 | Shrock | 119/23 |
| 2,219,297 | 10/1940 | Copeman | 119/23 |
| 2,392,532 | 1/1946 | Hyde | 119/23 |
| 2,887,987 | 5/1959 | Fitzgerald et al. | 119/23 |
| 3,130,706 | 4/1964 | Myaida | 119/23 |
| 3,818,868 | 6/1974 | Boehland, Jr. | 119/23 |
| 4,259,927 | 4/1981 | Clarke | 119/57.9 |

Primary Examiner—Robert P. Swiatak
Assistant Examiner—Todd E. Manahan
Attorney, Agent, or Firm—Bradford B. Kile; Ruffin B. Cordell

[57] ABSTRACT

A house for sheltering wild birds for use in an overall landscape or garden design including a tapered square column and a pyramidal roof member connected to form an obelisk-shaped main body portion. A floor surface is disposed within the square column to create a nesting cavity for accommodating a specific bird species. The main body portion may be releasably affixed to a mounting apparatus which is operable to stabilize and align the main body portion in the vertical plane. The mounting apparatus generally includes a square mounting plate releasably attached to a collar member which threadably engages a vertical support member.

6 Claims, 2 Drawing Sheets 5,103,768

BIRDHOUSE WITH NOVEL MOUNTING APPARATUS

BACKGROUND OF THE INVENTION

This invention relates to a novel birdhouse. More specifically, this invention relates to a birdhouse for use in an overall landscape or garden design.

In the past, many efforts have been made to provide birdhouses in various shapes and constructions to shelter birds from the weather and predators, while also displaying an attractive appearance.

A typical birdhouse generally consists of a square structure upon which a two faceted roof is placed. Such birdhouses include a small opening to allow ingress and egress of birds as well as a perch to facilitate such movement. In order to avoid predators, a conventional birdhouse must be placed atop a long pole, producing an unsightly appearance. Alternatively, the birdhouse may be hung from a high structure such as a tree or the eaves of a house, however, this arrangement limits the size and placement of the birdhouse.

Attempts have been made to provide distinctive and multifunctional birdhouses. One such attempt resulted in a conical-shaped birdhouse which serves as both a sheltering device and a feeder. The conical-shaped birdhouse has a circular cross section in the horizontal plane and incorporates a fairly limited vertical dimension as is frequently seen in conventional birdhouses. The limited vertical dimension stipulates that the conical-shaped birdhouse be positioned high above the ground to protect nesting birds from predators.

A further attempt to provide a distinctive and multifunctional birdhouse included a cylindrical structure mounted on a vertical supporting shaft. In this construction, a support mechanism permits vertical adjustment of the birdhouse, as well as horizontal angular adjustment to allow configuration of the cylinder structure in its transverse plane.

In order to prevent predation of the birds, the above-described birdhouses must be elevated from the ground; however, persons desiring birdhouses for their home may find the available birdhouses aesthetically displeasing, because they must be mounted on unconcealed poles or hung from trees, eaves, or the like.

In addition, attempts have been made to incorporate various ornamental designs into birdhouse structures in the shape of farm animals, windmills, and the like. However, these designs are typically facades mounted over an existing cubical birdhouse and, like other typical birdhouses, must be placed on an unsightly pole or hung from a high structure.

The difficulties suggested in the preceding are not intended to be exhaustive but rather are among many which may tend to reduce the user satisfaction with prior birdhouses. Other noteworthy problems may also exist; however, those presented above should be sufficient to demonstrate that birdhouses appearing in the past will admit to worthwhile improvement.

OBJECTS and BRIEF SUMMARY OF THE INVENTION

Objects

It is therefore a general object of the invention to provide a novel birdhouse which will obviate or minimize difficulties of the type previously described.

It is a specific object of the invention to provide a birdhouse which accommodates various species of birds.

It is another object of the invention to provide a birdhouse which prevents predation of birds nesting in the birdhouse.

It is still another object of the invention to provide a birdhouse which displays an attractive appearance in an overall landscape or garden design.

It is a further object of the invention to provide a birdhouse which may be mounted quickly and easily to a support member secured in the ground.

It is yet a further object of the invention to provide a birdhouse which may be precisely aligned and maintained in the vertical plane.

It is still a further object of the invention to provide a birdhouse which may be precisely aligned and maintained at a desired angle in the horizontal plane.

It is yet another object of the invention to provide a birdhouse which may be facilely cleaned.

It is yet still another object of the invention to provide a birdhouse which includes drainage and ventilation mechanisms.

BRIEF SUMMARY OF A PREFERRED EMBODIMENT OF THE INVENTION

A preferred embodiment of the invention which is intended to accomplish at least some of the foregoing objects includes four elongated side members longitudinally connected to form a tapered square column. The square column has a first end adjacent a ground surface and a second end. A pyramidal roof member is disposed on the second end of the tapered square column to form a obelisk-shaped main body portion.

A floor surface is positioned within the square column to create a nesting cavity for sheltering wild birds. The nesting cavity is defined by the floor surface, which rests on top of supporting stops, and the roof member. A passageway for permitting access to the cavity is fashioned in one of the four elongated side members, and a perch is disposed adjacent to the passageway to facilitate ingress and egress to and from the nesting cavity. The nesting cavity includes a clean-out panel releasably affixed to an elongated side member.

The first end of the square column is operable to be releasably attached to a mounting apparatus which permits alignment of the main body portion in the vertical plane. The mounting apparatus includes a vertical support member disposed in a ground surface, a collar member, and a generally square mounting plate. The mounting plate is bolted to the collar member which may be releasably affixed to the support member. Threaded bolts operably engage metal inserts in the mounting plate to secure the main body portion to the mounting plate. The position of the bolts creates orthogonal axes about which the main body portion may be pivoted.

THE DRAWINGS

Other objects and advantages of the present invention will become apparent from the following detailed description of a preferred embodiment thereof taken in conjunction with the accompanying drawings, wherein.

DETAILED DESCRIPTION

Figure 1:
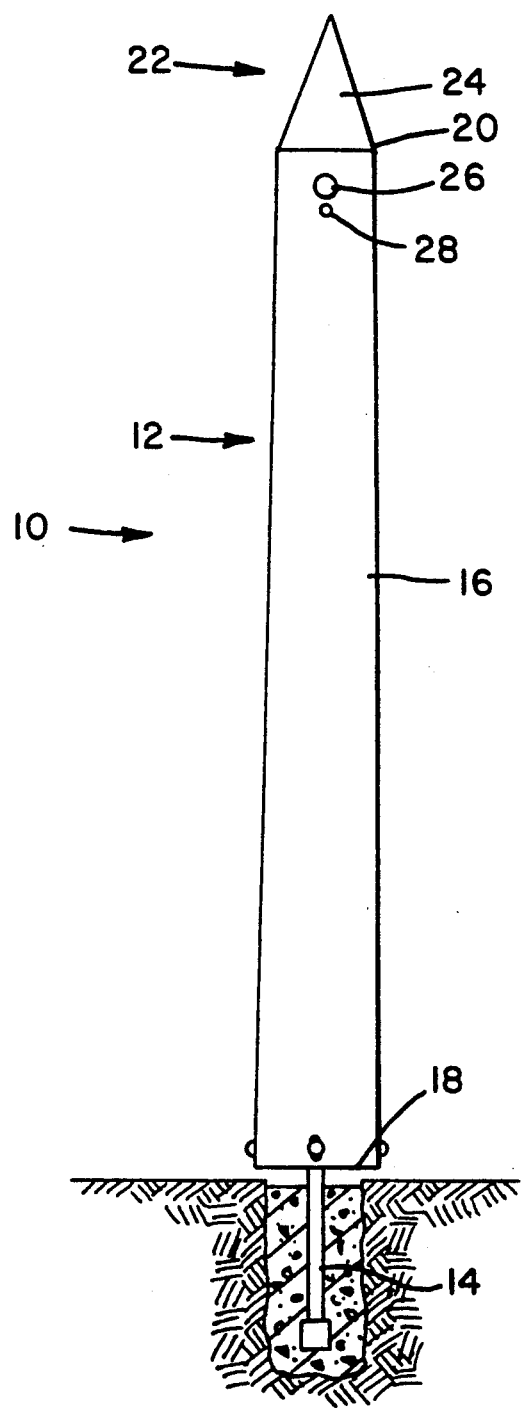
FIG. 1 is a front view disclosing the context of the subject invention and depicts a birdhouse mounted in an upright position.

Referring now to the drawings, wherein like numerals indicate like parts, and initially to FIG. 1, there will be seen an operative context of the subject invention. More particularly, a birdhouse 10 is shown mounted in an upright position adjacent to a ground surface. The birdhouse 10 generally consists of a main body portion 12 releasably affixed to a vertical support member 14. The main body portion includes four elongated side members 16 (only one shown) lock mitered along longitudinal edges to form a hollow square column. The square column gradually tapers from a first end 18 adjacent to the ground to a second end 20.

A roof member 22 is affixed to the second end 20 of the square column by a seamless cabinet joint. The roof member 22 has four triangular-shaped sides 24 (only one shown) which are connected to form a square pyramid. The pyramid-shaped roof member 22, in combination with the tapered square column, forms an obelisk-shaped integrally sealed birdhouse structure.

An passageway 26 is fashioned near the second end 20 of the square column to permit the ingress and egress of birds to and from the interior of the birdhouse 10. A perch 28 is disposed below passageway 26 to facilitate movement in and out of the birdhouse 10.

Figure 2:
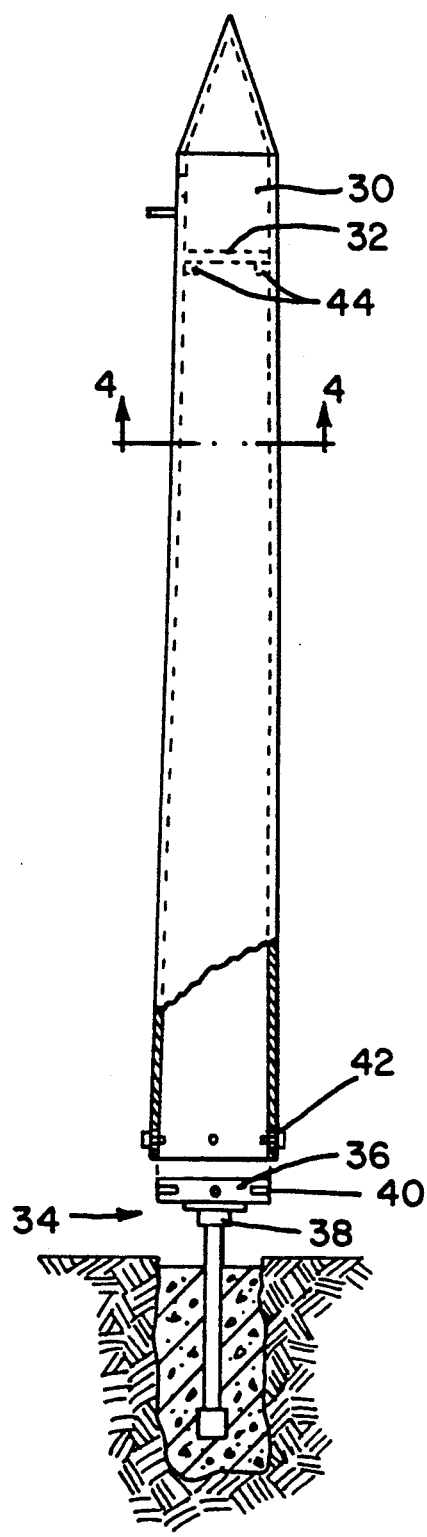
FIG. 2 is a cross-sectional side view of the birdhouse in accordance with the subject invention and shows a mounting assembly for securing the birdhouse in a ground surface.

Referring now to FIG. 2, a cross-sectional view of the birdhouse 10 reveals a interior nesting cavity 30 for sheltering birds defined by a floor surface 32 and the roof member 22. The passageway 26 and the nesting cavity 30 of the birdhouse 10 are constructed to be species specific in that different sized passageways and cavities will attract and accommodate different species of birds. Smaller birds such as wrens and chickadees require a passageway of approximately 1 and ⅛ inches in diameter, and the nesting cavity should have a 4 square inch base and a height of 8 inches to accommodate this species. Larger birds such as titmice, downy woodpeckers require a passageway of 1 and ¼ inches in diameter and the nesting cavity should be essentially the same as that for the smaller wrens and chickadees. Bluebirds require a passageway 1 and ½ inches in diameter and the nesting cavity should have a 5 square inch base and a height of 10 inches. By selecting the appropriate sized passageway and cavity, the birdhouse can be constructed to attract specific species of birds to the garden.

The main body portion 12 of the birdhouse 10 may range in height from 5 feet 9 inches to 8 feet 9 inches. A birdhouse for sheltering bluebirds is typically eight feet tall, while a birdhouse for nesting smaller birds including chickadees and wrens ranges from six feet to eight feet.

In contrast to conventional cubical birdhouses, the birdhouse of the subject invention has a height dimension requiring a mounting apparatus 34 to stabilize and align the birdhouse in the vertical plane. The mounting apparatus 34 includes a square mounting plate 36 releasably attached to a collar member 38 which operably engages the vertical support member 14. The square mounting plate 36 has four threaded metal inserts 40 (only three shown) operable to releasably engage with bolts 42 to secure the main body portion 12 to the square mounting plate 36.

The side members 16 of the main body portion 12 are lock mitered to each other according to cabinet makers specifications to provide the subject birdhouse 10 with an attractive outward appearance as well as to aid in the repulsion of predators. Birdhouses are typically plagued by snakes, weasels, and other predators who will raid nests and devour young or eggs. The birdhouse of the subject invention is advantageously constructed of ¾ inch MDO plywood, marine plywood, redwood heart cedar, or other high grade hardwood plywood finished to a satin smooth surface and primed and painted with three coats of high gloss exterior paint. This surface, in conjunction with the lock mitered side members, aids in the repulsion of such predators by providing a surface which is difficult to climb. Additionally, the extended height of the subject birdhouse makes hanging the birdhouse from high places or mounting the birdhouse on poles unnecessary in order to protect the birds from predators. Therefore, it is possible to provide a birdhouse which is resistance to predators without the use of poles or other unsightly accoutrements.

Figure 3:
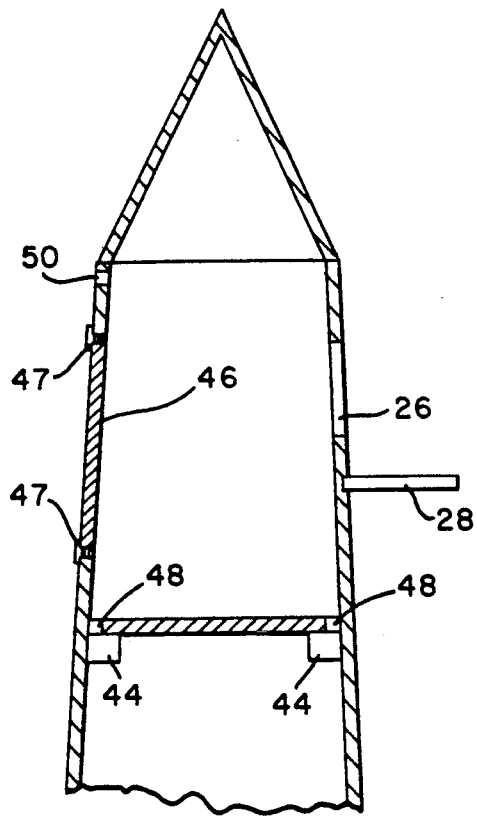
FIG. 3 is a cross-sectional side view of an upper portion of the subject invention.

Turning now to FIG. 3, there will be seen a cross-sectional side view of an upper portion of the birdhouse 10. The interior nesting cavity 30 is constructed by positioning the floor surface 32 atop supporting stops 44. The supporting stops 44 may be placed at a desired vertical position to create a large or small nesting cavity depending upon the species of bird. The floor surface 32 is slightly smaller than the inner cross-section of the square column to permit the floor surface 32 to slide freely before being set in place above the supporting stops 44.

A removable clean-out panel 46 is positioned opposite the passageway 26, in a preferred embodiment, to permit access to the nesting cavity 30. The clean-out panel 46 is releasably secured to the square column with four screws 47 of either brass, stainless steel, or wood. The clean-out panel may be removed to inspect the nesting cavity 30 and to perform annual maintenance. Old nests and debris may be removed from the cavity 30 either by hand or by directing a pressurized stream of water into the cavity 30.

Drainage channels 48 are provided in the floor surface 32 to redirect excess liquid from the nesting cavity 30 down the interior walls of the square column.

A ventilation slot 50 is fashioned in the elongated side member at a point above the clean-out panel 46 to permit ventilation of the nesting cavity 30. The ventilation slot 50, in a preferred embodiment, is ⅛ inches in diameter.

Figure 4:
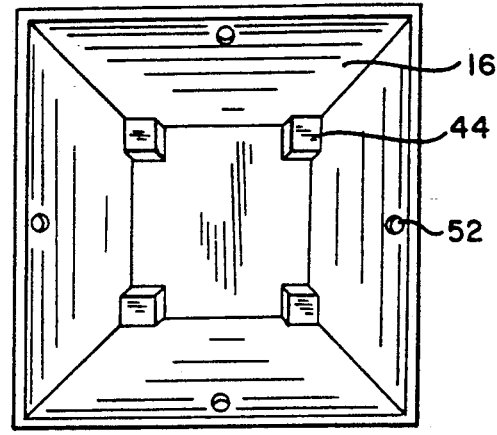
FIG. 4 is a bottom view of the birdhouse, taken along line 4—4 in FIG. 2, and shows slots for securing the birdhouse to a mounting plate.

FIG. 4 is a bottom perspective view and depicts the floor surface 32 resting on top of the supporting stops 44. There will also be seen a slot 52 bored through each of the elongated side members 16 to facilitate attachment of the square column to the mounting apparatus 34.

Figure 5:
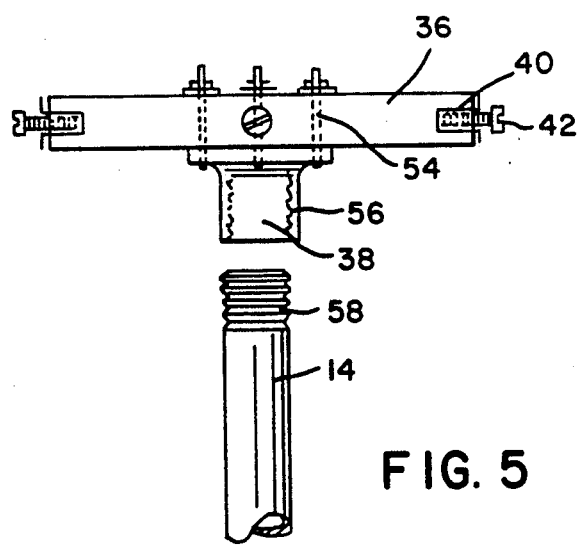
FIG. 5 is a front view of the mounting assembly of the subject invention.
Figure 6:
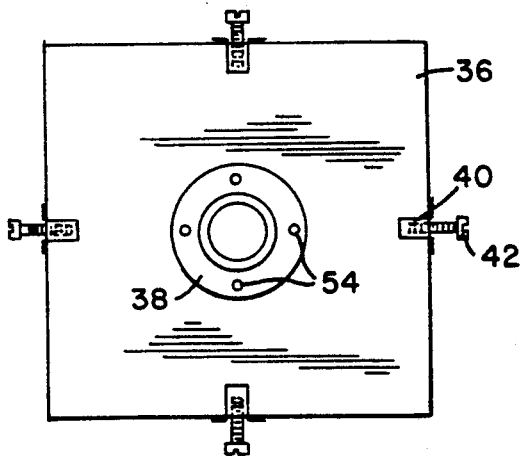
FIG. 6 is a top view of the mounting plate.

Referring to FIGS. 5 and 6, there will be seen the mounting apparatus 34 of the subject invention. The mounting apparatus 34 consists of a square mounting plate 36, which is generally two inches thick, and includes threaded female metal inserts 40 positioned at the mid point of each of the sides of the mounting plate 34. Bolts 42 are set in the threaded metal inserts 40 forming intersecting pivotal axes to facilitate vertical alignment of the main body portion 12 of the birdhouse 10.

The collar member 38 is attached to the center of the square mounting plate 36 through the use of bolts, washers, and nuts 54 disposed around the periphery of the collar 38. The collar 38 includes female threads 56 which are operable to releasably engage the male threads 58 of the vertical support member 14.

As an initial step in mounting the subject birdhouse, the vertical support member 14 is set into the ground and stabilized through the use of a cement footing, as shown in FIGS. 1 and 2. This rigid foundation is highly resistant to winds which may overturn the birdhouse. The vertical support member 14 may be constructed of any high strength material, and, in a preferred embodiment, the support member 14 is made of galvanized steel pipe. Once the vertical support member 14 has been set into the cement footer, the collar 38 may releasably engage the support member 14 through the interaction of compatible threads 56 and 58. Accordingly, the mounting apparatus 34 may be advantageously disposed in place prior to attaching the main body portion 12.

Since birdhouse 10 is a fairly elongated structure, it is imperative that differences in the grade of the ground in which the birdhouse 10 is set or the error in the vertical angle of the support member 14 is corrected in order to assure protection of the birds from predators. To accomplish this, the subject invention provides slots 52 which cooperate with bolts 42 to provide a gimbal-like arrangement which aligns the birdhouse 10 in the vertical plane.

In erecting the birdhouse of the subject invention, bolts 42 are removed from the mounting plate 36, and the first end 18 of the square column is then slidably disposed over the plate 36. The symmetry of the first end 18 of the main body portion 12 and the symmetry of the mounting plate 36 permits the main body portion 12 to be rotated at ninety degree intervals in the horizontal plane. Bolts 42 are threaded through slots 52 to engage the compatible metal inserts 40 so that a loose frictional arrangement exists between the mounting plate 36 and the main body portion 12. Accordingly, the main body portion 12 of the birdhouse 10 may be pivoted about the orthogonal axes, which are realized by the perpendicular positioning of the bolts 42, to vertically align the main body portion 12. Once the desired vertical position is attained, the bolts 42 are further tightened to fix the desired position.

The novel arrangement of the mounting plate 36 interacting with the square column facilitates the removal of the main body portion 12 from the mounting apparatus 34 in order to clean and remove any accumulated debris from the interior of the square column.

SUMMARY OF THE MAJOR ADVANTAGES OF THE INVENTION

After reading and understanding the foregoing inventive birdhouse, in conjunction with the drawings, it will be appreciated that several distinct advantages of the subject invention were obtained.

Without attempting to set forth all of the desirable features of the instant birdhouse, at least some of the major advantages of the invention include an obelisk-shaped main body portion 12 constructed by connecting a pyramidal roof member 22 to a tapered square column which creates an attractive and ornamental appearance. The square column, in turn, is constructed by lock mitering four elongated side members 16 along the edges and coated with a glossy exterior paint. The combination of the tightly fitted joints and the glossy exterior surface provides a structure which is difficult to climb, thereby discouraging potential predators.

A nesting cavity 30 is created within the main body portion 12 by placing a floor surface 32 on top of supporting stops 44. The size of the nesting cavity is defined by the roof member 22 and vertically adjustable floor surface 32. Different species of birds may thus be attracted to the subject birdhouse 10 by varying the size of the nesting cavity 30 as well as the size of the passageway 26 into the cavity 30.

The birdhouse 10 may be facilely aligned in the vertical plane due to the structure of the mounting apparatus 34. Once the main body portion 12 is slidably positioned on the mounting apparatus 34, the main body portion 12 may be pivoted about orthogonal axes created by bolts 42 which threadably engage the metal inserts 40 in the mounting plate 36. In addition, the mounting apparatus 34 includes a vertical support member 14 secured in a concrete footing to ensure stability of the birdhouse 10. Yet, since the main body portion 12 is releasably affixed to the mounting apparatus 34, the main body 12 may be easily and quickly removed for cleaning the interior of the square column.

The main body portion 12 of the birdhouse 10 may be rotated at ninety degree intervals about the square mounting plate 36 so that the birdhouse faces a desired direction.

Cleaning of the nesting cavity 30 is accomplished by removing a clean-out panel 46 from an elongated side member 16. Once the panel is removed, debris may be washed from the interior of the nesting cavity 30.

Ventilation is provided to the nesting cavity 30 through ventilation slot 50 fashioned in an elongated side panel 16 adjacent to the second end 20 of the square column. Drainage channels 48 are bored through the floor surface 32 to redirect water from the nesting cavity 30 to the interior of the square column.

In describing the invention, reference has been made to a preferred embodiment and illustrative advantages of the invention. Those skilled in the art, however, and familiar with the instant disclosure of the subject invention, may recognize additions, deletions, modifications, substitutions, and other changes which will fall within the purview of the subject invention and claims.

What is claimed is:

1. A bird house for providing shelter for wild birds comprising:
    four elongated side members, said four elongated side members longitudinally connected to form a square column of gradually decreasing cross-sectional area, said square column having,
    a first end operable to be placed substantially adjacent to a ground surface, and
    a second end upwardly extending away from the ground surface, said second end having a smaller cross-sectional area than that of said first end;
    a roof member having four triangular-shaped side members connected to form a square pyramid, said roof member disposed adjacent to said second end of said square column such that a base perimeter of said square pyramid is operably affixed to said second end of said square column to form an obelisk-shaped main body portion;
    a floor surface positioned within said square column to create a cavity for sheltering wild birds, said cavity having horizontal boundaries defined by said floor surface and said roof member;

means for supporting said floor surface;

ingress means for permitting access to said cavity, said ingress means being fashioned in one of said four elongated side members;

perch means disposed adjacent said ingress means;

means for cleaning said cavity fashioned in one of said elongated side members;

mounting means for mounting said first end of said square column adjacent to a ground surface wherein said mounting means is adapted to permit pivotal movement between said mounting means and said square column about a horizontal axis for facilitating alignment of said square column in a vertical plane.

2. A birdhouse as defined by claim 1 wherein said mounting means comprises:

a vertical support member disposed in a ground surface;

a collar member releasably affixed to said vertical support member;

a generally square mounting plate operable to releasably engage said collar member, said mounting plate being operable to slidably engage an inner surface of said first end of said square column formed by said four elongated side members; and gimbal means for aligning said square column in a vertical plane by providing pivotal engagement between said mounting plate and said square column.

3. A birdhouse as defined in claim 2 wherein said gimbal means comprises:

four threaded metal inserts, each of said four threaded metal inserts being disposed at a central point along a side of said mounting plate, each of said four threaded metal inserts being positioned adjacent a slot of each of said elongated side members; and compatibly threaded screws operable to penetrate each of said slots of said elongated side members and releasably engage with said threaded metal insert to create orthogonal axes for aligning said square column in a vertical plane.

4. A birdhouse as defined in claim 1 further comprising:

a ventilation opening fashioned in one of said elongated side members to permit the passage of air through said cavity.

5. A birdhouse as defined in claim 1 further comprising:

at least one drainage channel bored through said floor surface to permit the flow of liquids from said cavity.

6. A birdhouse as defined in claim 1 wherein said cleaning means comprises:

a panel operable to be releasably attached to one of said elongated side members to permit the removal of accumulated debris.

* * * * *